United States Patent

[11] 3,539,113

[72] Inventor Loren E. Tyler
 Wayzata, Minnesota
[21] Appl. No. 743,481
[22] Filed July 9, 1968
[45] Patented Nov. 10, 1970
[73] Assignee Letco, Inc.
 Long Lake, Minnesota
 a corporation of Minnesota

[54] DISTRIBUTOR MEANS FOR A FERTILIZER SPREADER
 7 Claims, 4 Drawing Figs.

[52] U.S. Cl. .............................................. 239/673,
 239/667, 239/676, 239/684
[51] Int. Cl. ...................................................... A01c 17/00
[50] Field of Search........................................... 239/667,
 668, 663, 666, 670, 671, 672, 673, 674, 676, 677,
 678, 682, 684, 687

[56] References Cited
 UNITED STATES PATENTS
 1,012,795 12/1911 Barth................................ 239/666
 2,340,657 2/1944 Goertzen......................... 239/673
 3,085,807 4/1963 Tyler................................ 239/674X
 3,099,369 7/1963 Schatz et al...................... 239/672X
 3,220,740 11/1965 Kavan et al..................... 239/687X
 3,232,627 2/1966 Larson ............................ 239/666

3,417,926 12/1968 Vorak ........................... 239/682X
 FOREIGN PATENTS
 733935 7/1955 Great Britain................ 239/682
 OTHER REFERENCES
 Adams & Doyle Equipment Mfg. Co., 3900 Broadway Quincy-Illinois Publication—"The Key To Successful Spreading" Class 239 Sub 684

*Primary Examiner*—M. Henson Wood, Jr.
*Assistant Examiner*—John J. Love
*Attorneys*—Donald R. Sjostrom and Robert P. White ABSTRACT: A trailer type fertilizer spreader with a hopper, a conveyor chain for moving fertilizer to the rear of the hopper, and distributor means at the rear of the hopper including a trough assembly enclosing the end of the conveyor chain and directing fertilizer into two side-by-side spillways which in turn direct it onto two rotatable distributor discs. A floating divider plate is pivotally mounted above the conveyor chain and extends along the top of the chain and downwardly along the end to divide the fertilizer substantially equally between the two spillways. An adjustable splash plate at the rear of the trough assembly is vertically adjustable toward and away from the distributor discs to adjust the distributor pattern of the discs. The drive for the discs includes a completely enclosed gear box assembly which is readily disassembled for repair or replacement of parts.

Patented Nov. 10, 1970

3,539,113

INVENTOR.
LOREN E. TYLER
BY Donald R. Jostrom
ATTORNEY

Patented Nov. 10, 1970 3,539,113

INVENTOR.
LOREN E. TYLER
BY
Donald R. Sjostrom
ATTORNEY

DISTRIBUTOR MEANS FOR A FERTILIZER SPREADER

BACKGROUND OF INVENTION

This invention relates to agricultural fertilizer spreaders of the type which are towed by a tractor or truck or are truck mounted and utilized for transporting and distributing dry fertilizer. These machines are generally relatively large and have a hopper which may be capable of carrying several tons of fertilizer. They include power driven apparatus for metering the fertilizer from the hopper and for distributing it onto the field to which it is to be applied. Such machines are well known and are commercially available from many sources.

Generally the means for distributing the fertilizer includes two side by side distributor discs rotating in opposite directions so that as the fertilizer is dropped onto them, it is spread rearwardly and outwardly. These distributor discs are generally driven from a power takeoff shaft or the like and have generally been interconnected by a belt or chain drive system which is in turn driven by the power takeoff shaft through a gear box. The structure has been relatively complex and cumbersome and also has resulted in having many parts exposed to the corrosive effects of the fertilizer.

Generally the conveyor which delivers the fertilizer to the rear of the hopper extends generally horizontally and as the fertilizer leaves the conveyor, it is divided by an appropriate means so that approximately half of it is fed to each of the distributor discs, as by a divider which splits the flow of fertilizer as it leaves the conveyor. It has been found that when the spreader is used on hillsides or the like, a substantial portion of the fertilizer may be carried on one side of the conveyor so that a much greater amount will be fed to one of the distributor discs than to the other. In the past an attempt has been made to use a floating divider plate which would divide the fertilizer before it reaches the end of the conveyor. This divider plate has normally been simply a pivoted strip of metal extending longitudinally of the conveyor and generally at its center. Such dividers have been only partially successful, especially when the spreader is used on steep inclines.

One of the problems encountered is the obtaining of a uniform spread pattern. Often this can be affected by manufacturing tolerances and the like in that small differences in spacing can have a substantial affect on the overall distribution pattern.

BRIEF SUMMARY OF INVENTION

This invention provides an improved distributor means for fertilizer spreaders of the type discussed above and specifically provides an improved drive means for the distributor discs, an improved floating divider for separating the fertilizer delivered by the conveyor so that it is fed substantially equally to the two distributor discs, and to an adjustable splash plate which is readily adjustable toward and away from the distributor discs to improve the spread pattern of the machine.

The drive means for the distributor discs includes a pair of gear boxes releasably connected by a hollow elongated housing means which encloses a connecting shaft extending between the two boxes. A pair of drive shafts for the distributor discs extend, one into each of the gear boxes, where they are operably connected to the connecting shaft by means of appropriate gearing. Also extending into one of the gear boxes is an input shaft which is geared to the connecting shaft. The entire assembly is enclosed and can be readily disassembled to repair or replace components therein.

The floating divider plate is hinged at a position substantially forward of the end of the conveyor and has a portion which extends along the top of the conveyor and another portion which extends downward along the end thereof so that the fertilizer is divided by this divider plate prior to its reaching the end of the conveyor and is maintained separated even after it has left the end of the conveyor. This assures that a substantially equal amount of fertilizer is fed to each of the distributor discs even if the machine is operated on a hillside where the fertilizer would normally move to one side of the conveyor. The pivotal mounting of the divider plate is such that gravity maintains a major portion of the plate substantially in engagement with the conveyor but allows it to move upward in case of build up on the conveyor or in case of a change in the position of the conveyor on the roller means on which it is carried.

Below and to the rear of the position at which fertilizer leaves the end of the conveyor there is provided a fixed splash plate or rear wall which contains the fertilizer and directs it downward toward the distributor discs and also acts as a splash plate to retain a certain amount of fertilizer which is otherwise thrown directly rearwardly by the distributor discs. It has been found that the position of the bottom of this splash plate with respect to the distributor discs has a critical effect upon the distribution pattern, particularly upon the amount of fertilizer which is discharged immediately to the rear of the machine. In machines of this type there may be a substantial amount of manufacturing tolerances and therefore it is extremely difficult to fix a splash plate at the optimum position and be assured that it will be in the optimum position in each machine. In order to overcome this problem, a vertically adjustable splash plate has been added which is readily movable toward and away from the distributor discs whereby each machine may be readily adjusted to provide the optimum distribution pattern.

Therefore, an object of this invention is to provide an improved distributor means for an agricultural fertilizer spreader.

Another object of the invention is to provide an improved drive means for the distributor discs of a fertilizer spreader wherein the drive means is completely enclosed but is readily disassembled for the repair or replacement of components.

A further object of the invention is to provide a drive means for the distributor elements which can be removed from the machine as a rigid unit and which unit can in turn be readily disassembled for repair or replacement of parts.

Another object of the invention is to provide an improved means for providing a substantially equal feed of fertilizer to each of two side by side distributor discs in spite of lateral inclination of the spreader.

A further object of the invention is to provide a floating divider plate for dividing the flow of fertilizer substantially equally between two distributor discs wherein the divider plate provides a dividing wall for the fertilizer during a portion of the time that it is carried by the conveyor and after it leaves the conveyor.

A still further object of the invention is to provide adjustable means for controlling the amount of material distributed directly to the rear of the spreader.

These and other objects of the invention will become apparent upon reading of the following detailed description of a preferred embodiment thereof.

DETAILED DESCRIPTION

Figure 1:
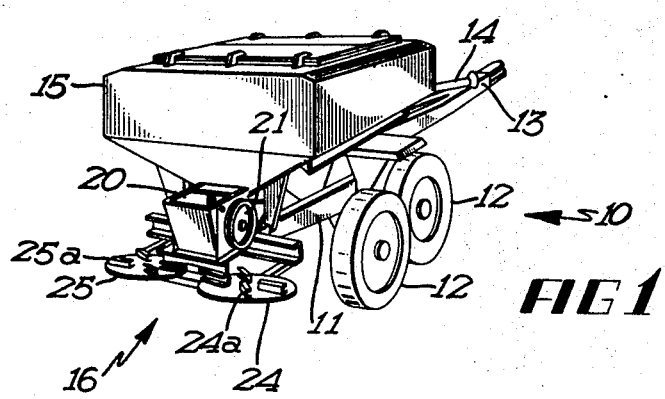
FIG. 1 is a prospective view of an agricultural fertilizer spreader utilizing the present invention.

Referring to FIG. 1 of the drawing, reference numeral 10 refers generally to an agricultural fertilizer spreader utilizing the distributor means of the present invention. Spreader 10 is of the trailer type including a frame 11 mounted on a plurality of wheels 12 and including a hitch 13 for attachment to a tractor or truck. A drive means 14 is adapted to be connected to a power takeoff or other source of power. A hopper 15 for containing fertilizer is mounted on the frame and adjacent the rear end of the machine is a distributor means 16. This distributor means is shown in greater detail in FIGS. 2, 3 and 4.

A conveyor which takes the form of an endless chain 17 extends from one end of the hopper to the other and at the bottom thereof for conveying fertilizer to the rear of the hopper. Preferably conveyor chain 17 extends over rollers or sprockets at opposite ends of the machine. At the rear end of the machine the chain extends over a sprocket 18 which is partially visible in FIG. 2. Chain 17 extends beyond the rear end of hopper 15 and there is substantially enclosed by a trough assembly 20 including sidewalls 20a and 20b and a rear wall 20c. Sprocket 18 is disposed within the trough assembly and is mounted on a shaft which extends through the walls thereof and on one end of the shaft has a pulley or sprocket 21 driven by a belt or chain 22 which in turn may be powered either by a ground drive (driven off one of the wheels 12) or operably connected to the power takeoff shaft 14. Trough assembly 20 also includes a fixed splash plate 23 which extends downward at the rear of the trough assembly and in a generally vertical plane towards the top of a pair of rotary distributor discs 24 and 25.

Distributor discs 24 and 25 are disposed generally horizontally in a side by side relationship at the rear of the machine generally under the assembly 20. Each is rotatable about a generally vertical axis. The discs include adjustable vanes 24a and 25a, respectively, each having an inner end attached generally on a radius of the disc and an outer end adjustable so that the angle of the vane with respect to the radius can be adjusted to in turn adjust the distribution pattern of the machine.

Figure 2:
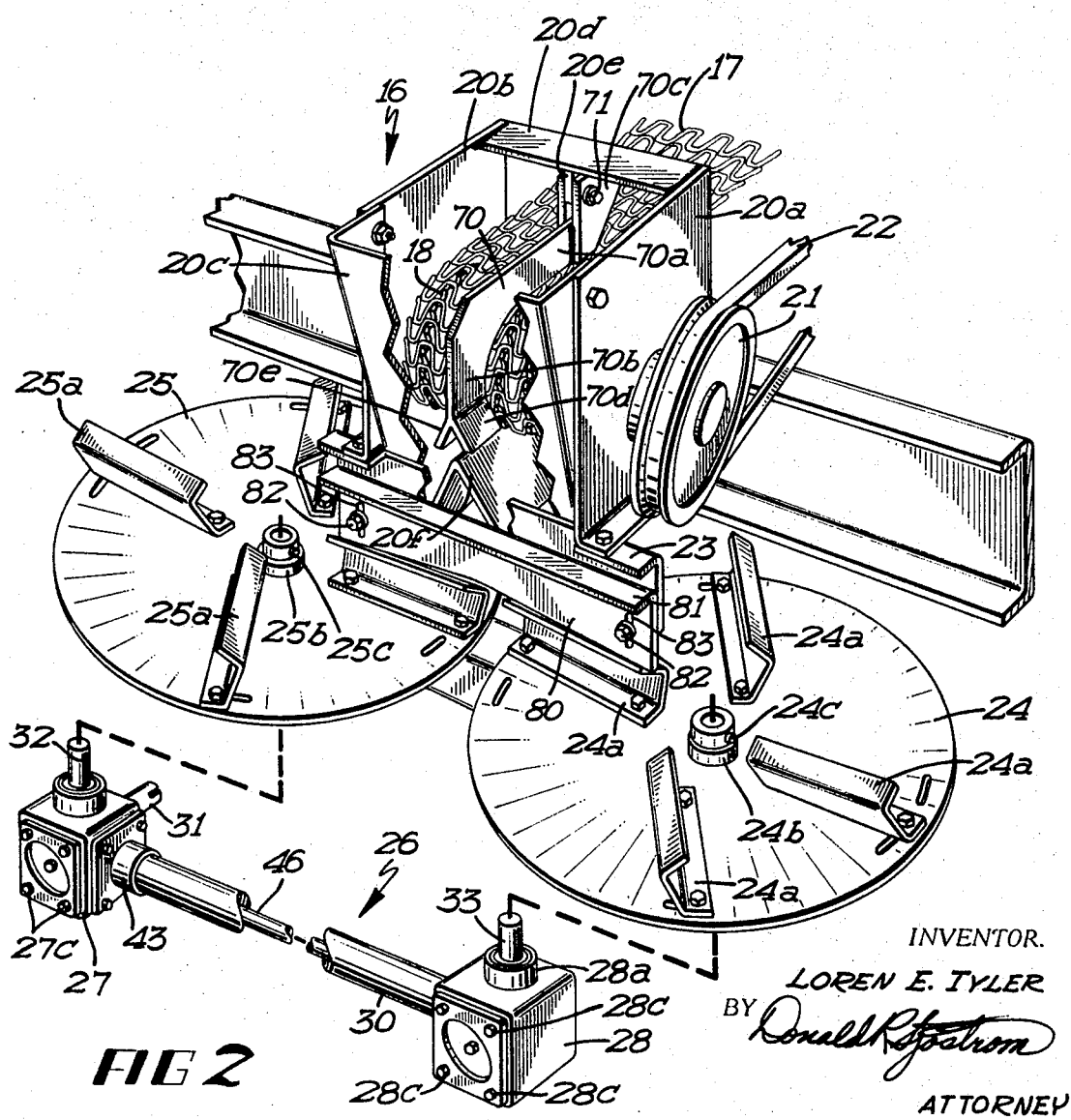
FIG. 2 is a fragmentary, partially exploded view of the distributor means of this invention, in prospective and with portions broken away to better disclose the invention.
Figure 3:
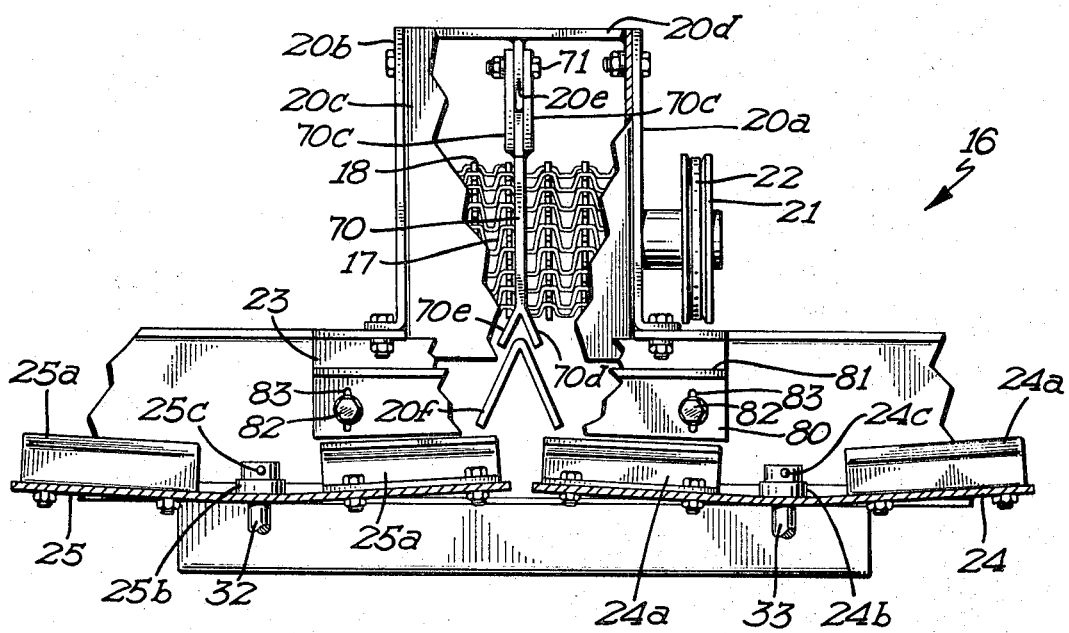
FIG. 3 is a fragmentary view of the distributor means as seen from the rear of the machine and with portions broken away to better show the invention.

Discs 24 and 25 are driven in opposite directions, disc 24 in a counter clockwise direction and disc 25 in a clockwise direction, so as to impell fertilizer in a rearward and outward direction. Mounted below the distributor discs is a drive means therefore which is generally designated by the numeral 26. As can be seen in FIG. 2, the drive means is completely enclosed and includes spaced gear boxes 27 and 28 connected by a hollow tube 30. A generally horizontally extending input shaft 31 extends into gear box 27 from the front side thereof and generally normal to tube 30. Extending from the top of gear box 27 is a vertically extending drive shaft 32 which is operably connected to distributor disc 25 by appropriate means such as a collar 25b including a setscrew 25c. Similarly, a vertically extending drive shaft 33 extends from the top of gear box 28 and is connected to disc 24 by means of a collar 24b and a setscrew 24c.

Figure 4:
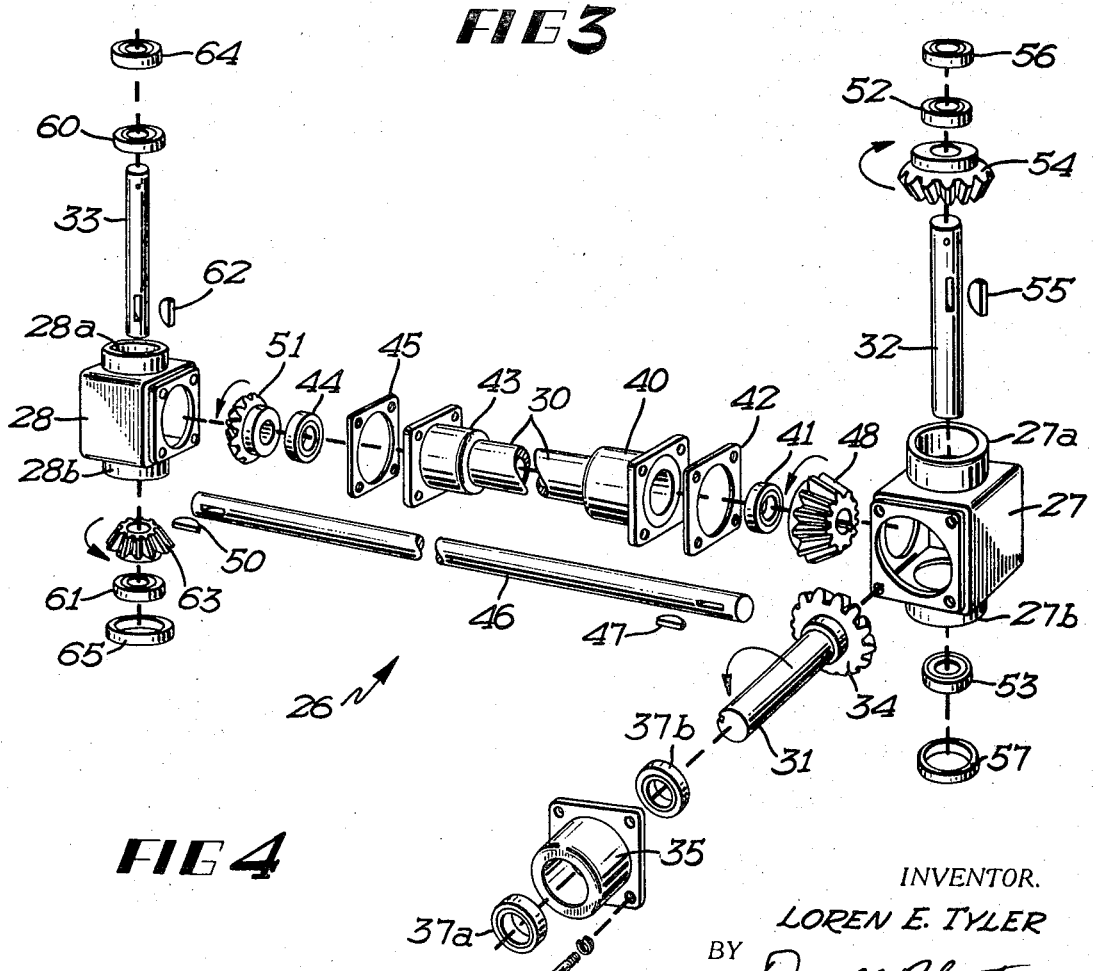
FIG. 4 is an exploded prospective view of the drive means for the distributor discs of the fertilizer spreader.

Drive means 26 is shown in greater detail in FIG. 4 wherein it has been exploded for clarity. As can best be seen in FIG. 4, input shaft 31 has fixed to one end thereof, inside of gear box 27, a driving gear 34. The other end of shaft 31 extends outwardly and is operably connected (by means not shown) to the power takeoff shaft 14. Releasably attached to the side of gear box 27 through which shaft 31 extends, is a housing member 35 having an annular outwardly extending shoulder portion and a generally rectangular base portion. This base portion is attached to the front side of gear box 27 by appropriate means such as a plurality of bolts 30, one of which is shown by way of example. Disposed within the annular portion of housing 35 are a pair of bearings 37a and 37b which may be retained by appropriate means such as snap rings (not shown) and which rotatably support shaft 31.

A similar opening is formed in one side of each of the gear boxes 27 and 28. Cooperating with the opening in the side of box 27 is a housing 40 which supports a bearing 41 and which is releasably secured to box 27 by appropriate means such as bolts or screws (not shown). An oil seal may be provided by a gasket 42 disposed between the flange on housing 40 and the wall of box 27. Similarly, a housing 43 cooperates with box 28 and supports a bearing 44. An oil seal may be provided by gasket 45 disposed between the flange on housing 43 and the wall of box 28 when these members are releasably secured by means not shown. Pressed into the housing members 40 and 43 is the hollow tubular member 30. By so doing, members 30, 40 and 43 comprise a single rigid unit which is releasably secured to boxes 27 and 28.

Disposed within the aforesaid unit, and supported by bearings 41 and 44, is a connecting shaft 46 which has one end disposed in box 27 and the other end disposed in box 28. Disposed within box 27 and secured to the first end of shaft 46 by a key 47, is a gear 48 which drivingly engages drive gear 34. Disposed within box 28 and secured to the second end of shaft 46 by a key 50 is a gear 51.

At the top and bottom, box 27 is provided with annular flanges 27a and 27b which support bearings 52 and 53, respectively, which rotatably support drive 32. A gear 54 is secured to shaft 32, between bearings 52 and 53, by a key 55. Drive shaft 32 extends out of the top of box 27 where it is sealed by an appropriate sealing member 56 while the opening in flange 27b at the bottom of the housing, is closed by an appropriate seal 57. Similarly, box 28 has annular flanges 28a and 28b at its top and bottom, respectively, and these flanges support a pair of bearings 60 and 61, respectively, which rotatably support drive shaft 32. Secured to drive shaft 32, between the two bearings, by a key 62, is a gear 63. Shaft 32 extends out of the top of box 28 and is sealed by an appropriate member 64 while the opening in the bottom box 28 is closed by a seal 55.

Gear 34 drivingly engages gears 48 and 54 whereby rotation of input shaft 31 in a counterclockwise direction (as seen in FIG. 4) results in rotation of gear 48, and thereby gear 51, in a counterclockwise direction (as viewed from the right hand end of shaft 46) and rotation of gear 54, and thereby shaft 32, in a clockwise direction (as viewed from the top). Rotation of gear 51 in turn causes rotation of gear 63, and thereby shaft 32, in a counterclockwise direction (as viewed from the top).

The construction of drive means 26 as described above, renders it a completely closed rigid unit which can be bolted directly to the frame by means of a plurality of tapped holes 27c and 28c, in the back side of boxes 27 and 28, respectively. The drive means is completely enclosed to keep out dirt and fertilizer and is a rigid unit so there are no problems with alignment and the like. Only two bearings are required for shaft 46 whereas two would be required at each box if a jointed shaft or chain drive were used. The drive means can be removed as a unit if desired and can be readily disassembled to replace or repair the components thereof.

At the forward end of the trough assembly 20 a crossbar 20d connects sides 20a and 20b. Generally at the center, it has a downwardly extending tongue 20e. Mounted on tongue 23 is a floating divider plate 70 which is generally L-shaped and includes a horizontal leg 70a and a vertical or downwardly extending leg 70b. At the forwardmost end of leg 70a, there are provided spaced, upwardly extending, members 70c which are disposed on opposite sides of tab 20e and which are connected thereto by a pivot pin 71. As is customary, trough assembly 20 includes, near its bottom, a V-shaped divider member 20f disposed so as to divide the trough assembly into a pair of side-by-side spillways or passages disposed so that fertilizer discharged by the conveyor is fed substantially equally to the two distributor discs because it is divided by the apex of member 20f. Floating divider 70 is supplemental to member 20f and is particularly useful when the spreader is used on a lateral incline, such as when it is used on a hillside and fertilizer would tend to shift to one side of the conveyor. Horizontal leg 70a is disposed substantially at the transverse center of conveyor chain 17 and prevents such shifting of the fertilizer to one side of the chain. It will be noted the floating divider 70 is shaped to conform with the contour of the top and end of conveyor 17. Its pivotal mounting is such that gravity normally maintains it in engagement with the chain. Should a build up of fertilizer occur or should the chain ride up on sprocket 18, the end of the divider plate is simply moved upward. Downwardly extending leg 70b continues to keep the fertilizer substantially equally divided even after it leaves the end of the conveyor chain. The lower end of leg 70b may be provided with a forked arrangement whereby it has one leg 70c of the fork deformed to the left and a second leg 70d deformed to the right of leg 70b to additionally separate the fertilizer into the two spillways. It should be noted that the forking of the lower end of leg 70b is optional and a straight leg may be used if desired.

Fixed splash plate 23 extends transversely to the rear of the machine and in a plane which intersects the discs 24 and 25. As noted previously, it tends to contain the fertilizer and to direct it onto the discs. Also, it deflects a certain amount of the fertilizer which is impelled by the discs towards the rear of the machine. It has been found that the spacing of the splash plate with respect to the discs is rather critical to the spread pattern and, further, that because of manufacturing tolerances, it is difficult to control the exact spacing between splash plate 23 and the top of the discs. Therefore, an adjustable splash plate 80 has been added. Splash plate 80 includes a main vertically extending portion which lies immediately adjacent splash plate 23 and also includes a horizontal flange 81 which can readily be grasped. Plate 80 is releasably connected to plate 23 by appropriate means such as screws 82 which are disposed in slots 83 in plate 80 and are threaded into tapped holes in plate 23. With this arrangement the vertical position of the splash plate with respect to the distributor discs can be very closely adjusted for an optimum distribution pattern in each machine.

The operation of the fertilizer spreader may be obvious from the foregoing description of the various components thereof. Briefly, hopper 15 is filled with fertilizer and the spreader is towed by a tractor or truck to the field where the fertilizer is to be spread. Power shaft 14 is connnected to a power takeoff or auxiliary engine or the like, it being essential only that shaft 14 be turned at a relatively constant rate of speed. Power is transmitted from shaft 14 through appropriate means (not shown) to input shaft 31 of drive means 26 and through drive means 26 to rotate distributor disc 24 in a counterclockwise direction and disc 25 in a clockwise direction. It is important that these discs be rotated at a relatively constant rate of speed so that a relatively uniform distribution pattern is obtained.

Distributor chain 70 is driven by means not shown, generally by a drive means driven by one of the wheels 12 of the spreader so that the rate at which fertilizer is conveyed to the distributor means from the hopper is dependent upon the ground speed of the spreader. As the chain moves and conveys fertilizer to the rear of the spreader, this fertilizer drops down off the end of the conveyor and is divided by the divider member 20f so that approximately an equal amount passes down each of the two spillways and onto the two distributor discs. Floating divider plate 20 acts as a wall separating the fertilizer into two substantially equal portions while it is still traveling down the conveyor chain so that if the spreader is used on a hillside, the fertilizer does not shift to one side of the conveyor and cause one distributor disc to receive a much greater amount than the other.

Leg 70b of divider plate 70, extending downwardly along the end of the conveyor, continues to maintain the wall between the two portions of the fertilizer even after it leaves the chain to assure that the two distributor discs receive a substantially equal amount of fertilizer.

As the fertilizer drops onto the discs, it is impelled rearwardly and outwardly by the vanes 24a and 25a which, as noted previously, are adjustable to control the distribution pattern. As the fertilizer drops onto the distributor discs they tend to throw a substantial amount of the fertilizer directly to the rear of the spreader so that a greater amount would be distributed there than would be distributed to the sides. Fixed splash plate 23 catches a portion of this fertilizer and causes it to drop back down onto the distributor discs. The clearance between the splash plate and the top of the vanes has a substantial effect upon the amount of fertilizer that is distributed immediately to the rear of the spreader. Adjustable splash plate 80 can be very accurately adjusted so as to closely control this clearance and thereby the distribution to the immediate rear of the machine.

As can be seen from the foregoing description, the present invention provides an improved distribution means for a fertilizer spreader which assures equal distribution of fertilizer to each of the two impeller discs even though the spreader is operated at a substantial incline. The adjustable splash plate assures that the desired distribution pattern can be maintained and the enclosed drive means 26 provides a rigid unit with no exposed components to be corroded by the fertilizer and which can be readily removed as a unit which can be readily disassembled for repair or replacement of parts. It eliminates the usual drive chains, jointed shafts and the like and substantially reduces the maintenance requirements of the machine.

A preferred embodiment of the invention has been disclosed and described herein. Various modifications may become apparent to those skilled in the art in view of the disclosure here without departing from the spirit of the invention. Therefore, it is to be understood that the invention is to be limited solely by the scope of the appended claims.

I claim:

1. In a distributor means for a fertilizer spreader of the type having a hopper for containing fertilizer and a generally horizontal conveyor for conveying fertilizer to the rear of the spreader and extending rearwardly beyond the end of said hopper, at least two spaced rotary distributor elements disposed side by side across the rear of the machine generally behind the end of the hopper and beneath the end of the conveyor, a generally boxlike trough assembly at the rear of the hopper and generally enclosing the end of said conveyor, said trough assembly including a portion extending generally downwardly for directing fertilizer discharged from the end of the conveyor downwardly onto said distributor elements and including means dividing said trough assembly into side-by-side spillways, each directing material towards one of the distributor elements and means for rotatably driving said distributor elements, the improvement comprising the conveyor having a generally flat top portion and a generally rounded rear end portion, the distributor means further including a floating divider plate cooperable with the rear end portion of the conveyor and formed with a generally L-shape, and means pivotally mounting said floating divider plate at a position above the top of said conveyor and forward of the rear end thereof, said divider plate being positioned so that one leg thereof extends along the top of said flexible member and generally in the center thereof and the other leg extends downwardly along the end thereof providing a dividing wall within the trough assembly, generally above and between the two spillways thereof, the divider plate being so constructed, and the pivot so placed, that gravity normally holds the free end thereof into engagement with the conveyor.

2. The distributor means of claim 1 wherein said L-shaped floating divider plate is contoured to substantially the same shape as that assumed by the rear end of the conveyor.

3. The distributor means of claim 1 wherein the trough assembly includes a fixed splash plate member forming a rear wall thereof, extending transversely of the spreader and lying generally in a vertical plane which intersects the top surface of said rotary distributor elements, said fixed splash plate forming a rear wall of the spillways for containing fertilizer as it is discharged from the end of the conveyor and for directing it onto said distributor elements; a vertically adjustable splash plate forming a downwardly extending extension of said fixed splash plate; and means releasably securing said adjustable splash plate and rendering it selectively movable toward and away from said distributor elements.

4. Distributor means for a fertilizer spreader of the type having a frame, a hopper on the frame, roller means mounted on the frame near the front and rear of the machine, and a generally horizontal conveyor including an endless elongated flexible member extending around said roller means and movable thereover to convey fertilizer from the front to the rear of the machine, the flexible member extending rearwardly beyond the end of the hopper, the distributor means comprising: at least one distributor element for receiving and spreading fertilizer, said distributor element being disposed at the rear of the machine, generally behind the end of the hopper and beneath the end of said flexible member; generally boxlike trough assembly means at the rear of the hopper, generally enclosing the end of said flexible member and including a portion extending generally downwardly for directing fertilizer discharged by the end of the flexible member downwardly onto said distributor element, the trough assembly including a fixed splash plate member extending transversely of the spreader, above said distributor member and behind the end of the flexible member and forming a rear wall of the trough assembly for containing fertilizer as it is discharged from the end of said flexible member and directing it onto said distributor element; a vertically adjustable splash plate forming a downwardly extending extension of said fixed splash plate, said adjustable splash plate lying in a plane intersecting said distributor element; and means releasably securing said adjustable splash plate with respect to said fixed splash plate and rendering said adjustable splash plate movable within said plane toward and away from said distributor element.

5. Distributor means for a fertilizer spreader of the type having a hopper, roller means mounted near the rear of the hopper, and a generally horizontal conveyor including an endless elongated flexible member extending around said roller means and movable thereover to convey fertilizer from the front to the rear of the machine, the flexible member extending rearwardly beyond the end of the hopper, the distributor means comprising: at least two spaced distributor elements disposed side by side across the rear of the machine generally behind the end of the hopper and beneath the end of said flexible member; generally boxlike trough assembly means at the rear of the hopper and generally enclosing the end of said flexible member which extends rearwardly from the hopper, said trough assembly including a portion extending generally downward for directing fertilizer discharged by the end of the flexible member downwardly onto said distributor elements, and including means dividing said trough assembly into two side-by-side spillways, each directing material towards one of the distributor elements; a floating divider plate formed with a generally L-shape; and means pivoting said divider plate at a position above the top of said flexible member and forward of the rear end thereof, said divider plate being positioned so that one leg thereof extends along the top of said flexible member and the other leg extends downwardly along the end thereof, providing a dividing wall within the trough assembly generally above and between the two spillways thereof, the divider plate being so constructed and the pivot so placed, that gravity normally holds the free end thereof into engagement with the flexible member.

6. The distributor means of claim 5 wherein the flexible member assumes a generally rounded shape at the end thereof where it passes over the rear roller, and the inside of the L-shaped floating divider plate is contoured to substantially the same shape at that assumed by the end of said flexible member.

7. The distributor means of claim 5 wherein the end of the downwardly extending leg of the floating divider plate is constructed with a forked assembly at the end thereof with a pair of legs extending in opposite sideways directions from the divider plate to separate the flow into the two spillways.